Patented May 12, 1931

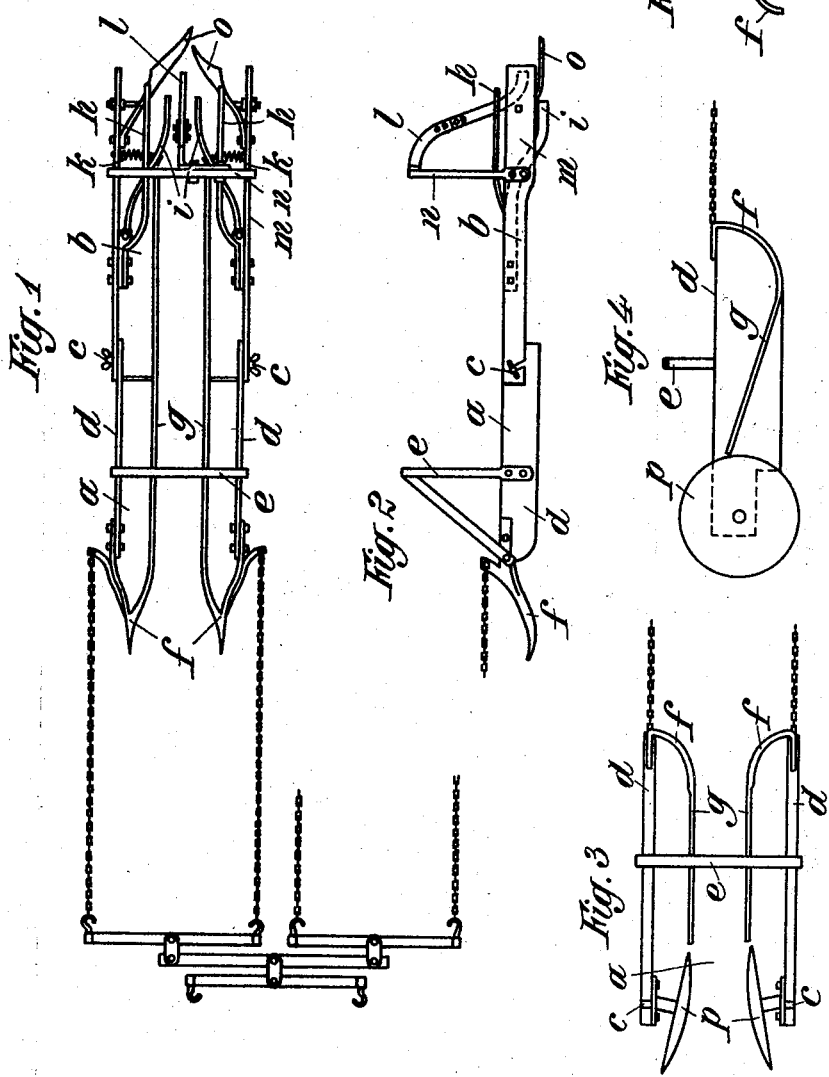

1,805,044

UNITED STATES PATENT OFFICE

RUDOLF LAEMMLEN, OF GROSSGARTACH, NEAR HEILBRONN, GERMANY

BEET TOPPER

Application filed July 14, 1930, Serial No. 467,879, and in Germany May 5, 1928.

This invention relates to a beet topper with rails for the beet top and cutters which are mounted on a frame adapted to swing on a horizontal axis. This frame is connected to a front carriage which carries in front laterally inclined guide shoes and is controlled by the latter and by the beets themselves.

The front carriage may be provided at the rear end with disks which preferably extend obliquely to the longitudinal axis of the beet topper.

According to the invention, a beet topper of very simple construction is produced, which is adapted especially for small farms. The beet topper works only one row of beets but is self-controlled so that beets outside the row may also be topped.

Two constructional forms of the beet topper according to the invention are shown in the accompanying drawings.

Figure 1 is a plan view and
Figure 2 a side elevation of the complete beet topper.
Figure 3 is a plan view of a modified construction of the front carriage only and
Figure 4 is a side elevation thereof.
Figure 5 is a diagrammatic front elevation of the guide shoe according to Figures 3 and 4.

According to Figures 1 and 2, the beet topper comprises the front carriage $a$ and the rear carriage or frame $b$ connected therewith at $c$ in such a manner that the rear carriage may swing out about a horizontal axis relatively to the front carriage. The runners $d$ of the front carriage $a$ are held together by a yoke $e$ and carry in front guide shoes $f$, the tips or points of which are inclined outwardly so that beets may also be seized which have grown outside the row. The chains for the draft animal engage with the shoes $f$ and two toppers may be drawn by one draft animal. The guide shoes $f$ are joined to the rails $g$ for the beet top which extend to the rear carriage $b$ and are thence prolonged by rods $h$. The rear carriage has also guide rails $i$ which are connected in the horizontal plane and subjected to the pressure of springs $k$ so that their spacing corresponds to the thickness of the beet. Between these guides is a feeler $l$ which is adjustable upwards and mounted on the yoke $n$ securing the runners $m$ of the rear carriage; the said feeler $l$ is adjusted upwards by the guides $i$ in such a manner that it always moves over the middle of the beet top. Inclined adjustable cutters $o$ for topping the beets are also mounted on the frame $b$. Owing to the connection of the frame $b$ with the carriage $a$ provided in front with guide shoes $f$, a suitable proportioning of the weight of the complete topper will render it possible for the topper to be led by the guide shoes to the beets.

Figures 3-5 show a modified construction of the front carriage $a$ according to Figures 1 and 2. The reference characters are the same as in the construction according to Figures 1 and 2. The rear frame $b$ is pivoted at $c$ to the front carriage of Fig. 3, similarly as the construction shown in Fig. 1. The use of the construction according to Figures 3-5 is very advantageous if the beets have many dried or semi-decayed leaves which have no support in themselves and are therefore difficult to move along the rails $g$ according to the construction of the beet topper in Figs. 1 and 2; they are forced away laterally and may then give rise to a jamming of the cutting members. The guide shoe $f$ has such a form or shape according to Figures 3-5 that an adhering of beet leaves or weeds is impossible. In order to cut off the dried and semi-decayed leaves and clear the path for the cutting members, rotary cutter blades or disks $p$ are provided at the end of the front carriage $a$ according to Figs. 3-5 which are preferably inclined to the longitudinal axis of the beet topper.

I claim:

1. Beet topper with rails for the beet top and cutters in a frame, said frame being pivotally connected to a front carriage, said carriage carrying in front outwardly inclined guide shoes and provided at the rear end with rotary disks.

2. Beet topper with rails for the beet top and cutters in a frame, said frame being pivotally connected to a front carriage for movement about a horizontal axis, said front carriage carrying in front outwardly inclined guide shoes and provided at the rear end with rotary disks which are arranged behind obliquely to the longitudinal axis of the carriage.

3. A beet topper comprising a front carriage and a rear frame, the frame having cutting blades upon its rear ends, said carriage having guide shoes carried thereby and extending rearwardly, and oppositely disposed rotating cutter blades carried by the rear end of the carriage and located rearwardly of the guide shoes, said rotating blades being arranged obliquely with respect to the longitudinal axis of the carriage and frame.

4. A beet topper comprising a front carriage including spaced runners, guide shoes having their forward ends fixed to the runners, vertically disposed rotatable cutting disks carried by the inner ends of the runners rearwardly of the guide shoes, said cutting disks being arranged obliquely with respect to the longitudinal axis of the carriage, and a rear frame connected with the carriage and having stationary cutters upon its rear end.

In testimony whereof I affix my signature.

RUDOLF LAEMMLEN.